(12) United States Patent
Chiang

(10) Patent No.: US 12,533,322 B2
(45) Date of Patent: Jan. 27, 2026

(54) NANOPARTICLE CONTAINING HYDROPHOBIC SUBSTANCE AND MANUFACTURING PROCESS AND USE THEREOF

(71) Applicants: Bing-Juin Chiang, Taipei (TW); Cardinal Tien Hospital, New Taipei (TW)

(72) Inventor: Bing-Juin Chiang, Taipei (TW)

(73) Assignees: Bing-Juin Chiang, Taipei (TW); Cardinal Tien Hospital, New Taipei (TW)

( * ) Notice: Subject to any disclaimer, the term of this patent is extended or adjusted under 35 U.S.C. 154(b) by 504 days.

(21) Appl. No.: 18/013,815

(22) PCT Filed: Dec. 20, 2021

(86) PCT No.: PCT/CN2021/139568
§ 371 (c)(1),
(2) Date: Dec. 29, 2022

(87) PCT Pub. No.: WO2022/135322
PCT Pub. Date: Jun. 30, 2022

(65) Prior Publication Data
US 2023/0310335 A1    Oct. 5, 2023

(30) Foreign Application Priority Data
Dec. 25, 2020    (CN) .................. 202011559617.9

(51) Int. Cl.
| | | |
|---|---|---|
| *A61K 9/51* | (2006.01) | |
| *A61K 38/48* | (2006.01) | |
| *A61P 13/10* | (2006.01) | |
| *B82Y 5/00* | (2011.01) | |
| *B82Y 30/00* | (2011.01) | |
| *B82Y 40/00* | (2011.01) | |

(52) U.S. Cl.
CPC ........ *A61K 9/5169* (2013.01); *A61K 38/4893* (2013.01); *A61P 13/10* (2018.01); *B82Y 5/00* (2013.01); *B82Y 30/00* (2013.01); *B82Y 40/00* (2013.01)

(58) Field of Classification Search
CPC ... A61K 9/5169; A61K 38/4893; A61P 13/10; B82Y 5/00; B82Y 30/00; B82Y 40/00
See application file for complete search history.

(56) References Cited

U.S. PATENT DOCUMENTS

| | | | | |
|---|---|---|---|---|
| 2006/0104994 A1* | 5/2006 | Hunt | ............... | A61K 9/0019 424/239.1 |
| 2015/0313973 A1* | 11/2015 | Forssen | ............... | A61K 47/36 424/94.67 |
| 2016/0199464 A1* | 7/2016 | Barnett | ............... | A61K 45/06 424/94.5 |
| 2020/0009068 A1 | 1/2020 | Ensign | | |

FOREIGN PATENT DOCUMENTS

| | | |
|---|---|---|
| CN | 101002772 A | 7/2007 |
| CN | 101036809 A | 9/2007 |
| CN | 101912366 A | 12/2010 |
| CN | 108486879 A | 9/2018 |
| WO | WO2015168471 A1 | 11/2015 |
| WO | WO2019155389 A | 8/2019 |

OTHER PUBLICATIONS

Andre Vieira Braz et al., "Combined treatment with botulinum toxin and hyaluronic acid to correct unsightly lateral-chin depression" in An Brass Dermatol. 2013; 88(1):138-140. (Year: 2013).*
Lucia Salvioni et al., "The emerging role of nanotechnology in skincare" in Advances in Colloid and Interface Science, available May 11, 2021. (Year: 2021).*
Khan et al. "Nanoparticles: Properties, applications and toxicities" in Arabian Journal of Chemistry, 2017. (Year: 2017).*
Zhao, Rui et al., "Preparation and Drug Release Characteristics of Gelatin/ Alginate Microspheres with Core/Shell Structure", Materials Science and Engineering of Powder Metallurgy, vol. 22, No. 2, Apr. 30, 2017, Materials Science and Engineering of Powder Metallurgy.
Yang, Chen et al., "Preparation and Drug Release Profile of Composite Gel Beads Based on Natural Polysaccharide", vol. 28, No. 4, Dec. 31, 2020, Journal of Functional Polymers.

* cited by examiner

*Primary Examiner* — Blessing M Fubara
(74) *Attorney, Agent, or Firm* — WPAT, PC

(57) ABSTRACT

The present disclosure provides a nanoparticle containing hydrophobic substance and manufacturing process and use thereof, wherein the nanoparticle containing the hydrophobic substance includes an emulsified layer containing an emulsified hydrophobic substance; and an outer layer containing an alginate and a hyaluronic acid; wherein the outer layer is deposited on an outer side of the emulsified layer.

14 Claims, 6 Drawing Sheets

NANOPARTICLE CONTAINING HYDROPHOBIC SUBSTANCE AND MANUFACTURING PROCESS AND USE THEREOF

CROSS-REFERENCE TO RELATED APPLICATION

This application claims priority of China patent application No. 202011559617.9, filed on Dec. 25, 2020, the content of which is incorporated herein in its entirety by reference.

BACKGROUND OF THE INVENTION

1. Field of the Invention

The present invention relates to the technical field of a nanoparticle, in particular to a nanoparticle containing hydrophobic substance and manufacturing process and use thereof.

2. The Prior Art

The bladder is a part of the urinary system. It is located in the pelvic cavity, about below the lower abdomen. It is elastic and a hollow organ similar to a balloon, which is mainly used to store and empty urine. The bladder wall comprises a multi-layered structure, from the bladder lumen to the outside are the urothelium, the detrusor, and the adventitia. The urothelium would form an impermeable barrier to tightly connect epithelial cells, especially the mucosal cells in these epithelial cells secrete polysaccharide proteins to form a special structure of the GAG layer, which prevents toxic waste solutes and potassium ions in urine from penetrating into the submucosa.

In the treatment of bladder-related diseases or symptoms, drugs or active substances may be administered orally. However, this approach may require taking larger doses of the drug or active substance to reach the actual dose in the bladder, which may increase the chance of side effects. Therefore, local treatment methods such as bladder injection or intravesical therapy can be selected to increase the efficiency of treatment. Compared with the treatment methods that require anesthesia, such as cystoscopic injection, intravesical therapy is a non-invasive treatment method with less burden on patients. Intravesical therapy is to infuse the drug or active substance to be applied to the bladder wall into the bladder through the urethra, and after the drug or active substance stays in the bladder for a period of time, it is brought into contact with the bladder mucosal epithelium for localized administration of drugs or active substances.

However, in addition to the possible dilution of the dose concentration by urine in the bladder, intravesical therapy may also limit the administration of drugs or active substances due to the barrier structure of the bladder lining. And because the surface of the GAG layer of the bladder mucosa has a hydrophilic structure, it is difficult for hydrophobic drugs or active substances to be used for non-invasive treatment of patients by intravesical therapy.

Therefore, it is indeed necessary to develop a carrier for drugs or active substances that can effectively increase the efficiency of intravesical therapy, especially for carrying hydrophobic drugs or active substances.

SUMMARY OF THE INVENTION

A primary objective of the present invention is to provide a nanoparticle containing a hydrophobic substance, comprising: an emulsified layer containing an emulsified hydrophobic substance; and an outer layer containing an alginate and a hyaluronic acid; wherein the outer layer is deposited on an outer side of the emulsified layer.

Another objective of the present invention is to provide a method for preparing the abovementioned nanoparticle, comprising: emulsifying a hydrophobic substance to form an emulsified layer; and depositing an outer layer containing an alginate and a hyaluronic acid on the outer side of the emulsified layer.

Another objective of the present invention is to provide a use of the abovementioned nanoparticle for the manufacture of a pharmaceutical composition for intravesical therapy.

According to an embodiment of the present invention, emulsifying the hydrophobic substance is emulsified with a gelatin, a chitosan, or a combination thereof.

According to an embodiment of the present invention, the hydrophobic substance is a botulinum toxin.

According to an embodiment of the present invention, the alginate and the hyaluronic acid are formed in a ratio of 0.8-1.2:0.8-1.2.

According to an embodiment of the present invention, the nanoparticle has a diameter of 16-24 nm.

According to an embodiment of the present invention, depositing the outer layer is carried out with an ultrasound.

According to an embodiment of the present invention, the intravesical therapy is used to treat interstitial cystitis, chemical cystitis, and/or overactive bladder.

The beneficial effects of the abovementioned technical solutions of the present disclosure are as follows.

The present disclosure can prepare the nanoparticle of the present disclosure only by means of ultrasonic vibration. Emulsifying the hydrophobic substance is emulsified with a gelatin, a chitosan, or a combination thereof to form an emulsified layer, and depositing an outer layer containing an alginate and a hyaluronic acid on the outer side of the emulsified layer to produce the nanoparticle of the present disclosure. The nanoparticle has a stable structure at different temperatures and pH values, indicating that it can maintain high stability in the physiological environment of the bladder.

Furthermore, in the test of the experimental animal model, it can be known that the nanoparticle in the present disclosure can indeed be used to load the hydrophobic drugs or active substances for treating the bladder. And the formed nanoparticle can accurately release the drug or active substance loaded in it to the inner wall of the bladder only by the method of intravesical therapy, not only for damaged bladder epidermis, but also for users with intact bladder epidermis.

BRIEF DESCRIPTION OF THE DRAWINGS

The following drawings form part of the present specification and are included here to further demonstrate some aspects of the present invention, which can be better understood by reference to one or more of these drawings, in combination with the detailed description of the embodiments presented herein.

DETAILED DESCRIPTION OF THE PREFERRED EMBODIMENT

Figure 1A:
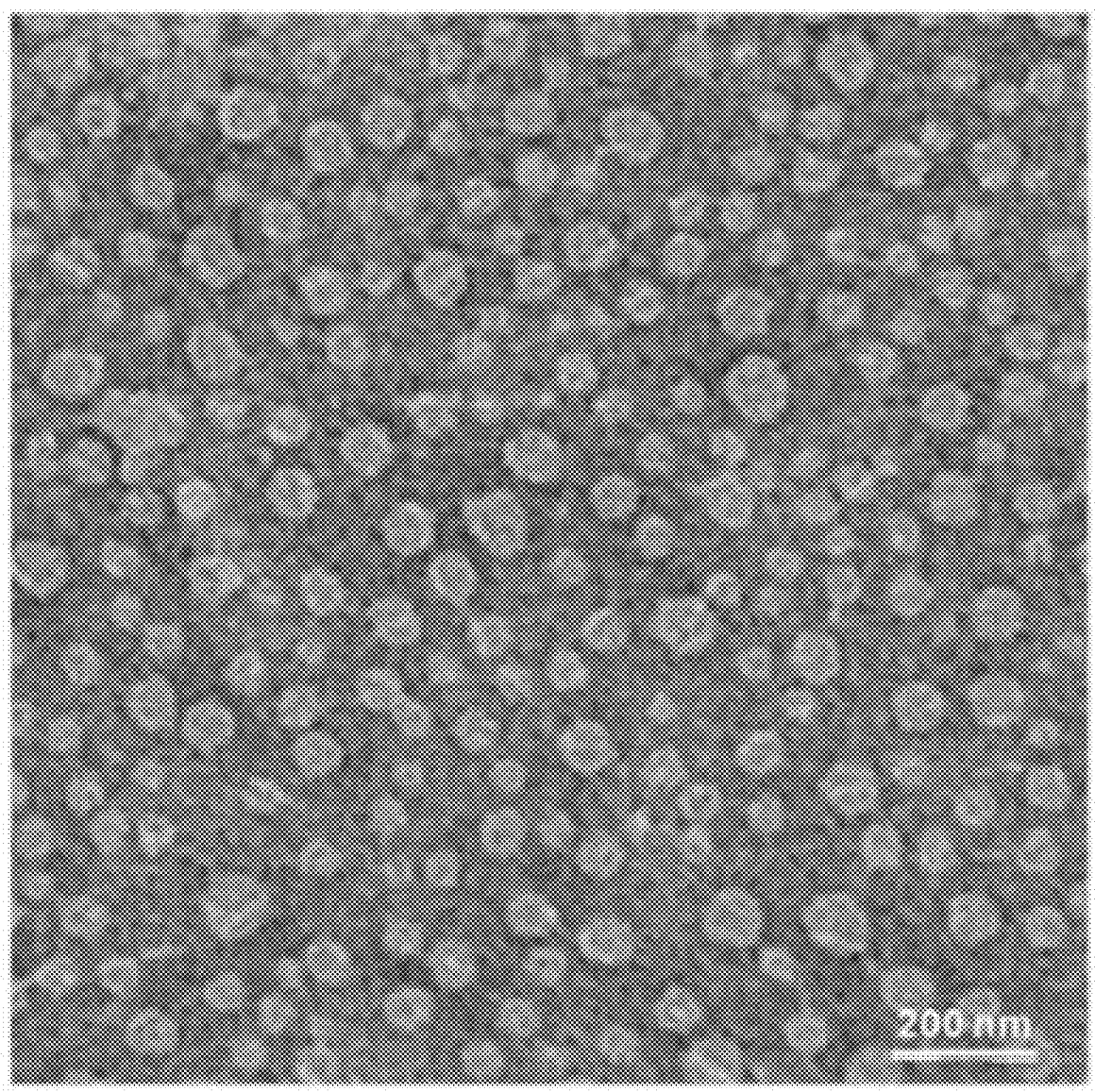
FIG. 1A is a photograph of the nanoparticle in Example 1 under an electron microscope.

In the following detailed description of the embodiments of the present invention, reference is made to the accompanying drawings, which are shown to illustrate the specific embodiments in which the present disclosure may be practiced.

These embodiments are provided to enable those skilled in the art to practice the present disclosure. It is understood that other embodiments may be used and that changes can be made to the embodiments without departing from the scope of the present invention. The following description is therefore not to be considered as limiting the scope of the present invention.

As used herein, the data provided represent experimental values that can vary within a range of ±20%, preferably within ±10%, and most preferably within ±5%.

Definition

In the embodiments of the present disclosure, the term "nanoparticle" means a nanoparticle containing a hydrophobic substance, comprising: an emulsified layer containing an emulsified hydrophobic substance; and an outer layer containing an alginate and a hyaluronic acid; wherein the outer layer is deposited on an outer side of the emulsified layer to form the nanoparticle. In an embodiment, the hydrophobic substance is a botulinum toxin (BoNT).

In the embodiments of the present disclosure, the botulinum toxin used may be botulinum toxin type A (BoNT-A), botulinum toxin type B (BoNT-B), botulinum toxin type C (BoNT-C), botulinum toxin type D (BoNT-D), botulinum toxin type E (BoNT-E), botulinum toxin type F (BoNT-F), and/or botulinum toxin type G (BoNT-G), preferably botulinum toxin type A.

According to the present disclosure, the operating procedures and parameter conditions related to ultrasonic vibration fall within the professional quality and routine technical scope of those skilled in the art.

According to the present disclosure, the operating procedures and parameter conditions related to intravesical therapy fall within the professional quality and routine technical scope of those skilled in the art.

Materials Used

In the context, the hyaluronic acid (HA) used is "Mylan" CYSTISTAT Sterile Sodium Hyaluronate Solution, which was purchased from CHENG SHING PHARMACEUTICAL CO., LTD. (Taiwan, China), Health Department Medical Device Input No. 010460, concentration 40 mg/50 mL. The used botulinum toxin (Botox) is BOTOX (BOTULINUM TOXIN TYPE A) PURIFIED NEUROTOXIN COMPLEX "ALLERGAN", which was purchased from ALLERGAN PHARMACEUTICALS TAIWAN CO., LTD. (Taiwan, China), Health Department Bacterial Epidemic Input No. 000525. The alginate used is Low-viscosity sodium alginate; Mw=40,000 g/mol, wherein the content of mannuronic acid is high (the molar ratio of mannuronic acid to guluronic acid (M/G) is 1.56), which was purchased from Sigma-Aldrich Corporation in China. The used gelatin is pigskin gelatin, which was purchased from Fluka Analytical, Germany; 4% calcium chloride ($CaCl_2$)) in water, and cooking oil or olive oil was used as a medium.

Statistical Methods

In the present disclosure, values in all experiments are expressed as mean±standard error of the mean (SEM). Statistical differences within each experimental group are assessed by paired t-test. Statistical differences between experimental groups are assessed by one-way analysis of variance. Comparisons between experimental groups are performed by Duncan's multiple-range test. A statistically significant difference is indicated if the P value is less than 0.05.

Measuring Instrument

Dynamic Light Scattering/Zeta Potential Analyzer (DLS).

Dynamic Light Scattering/Zeta Potential Analyzer use a laser to irradiate a solution containing the particles to be tested, and cause the particles to be tested in the solution to generate scattered light. Then, the correlation function is used to process the scattered light intensity of the particles due to the Brownian motion, and the diffusion coefficient of the particles to be tested is obtained. Finally, according to the Stokes-Einstein formula, the hydration diameter of the particles to be tested is calculated.

The present disclosure provides a nanoparticle containing a hydrophobic substance, a method for preparing the nanoparticle, and a use of the nanoparticle for the manufacture of a pharmaceutical composition for intravesical therapy. In the nanoparticle of the present disclosure, a positively charged material such as gelatin or chitosan is firstly emulsified with the hydrophobic substance to be contained to form an emulsified layer, and alginate and hyaluronic acid is used as an outer layer to deposit on the outer side of the emulsified layer to form the nanoparticle of the present disclosure. The nanoparticle in the present disclosure can indeed be used to load the hydrophobic drugs or active substances for treating the bladder. And the formed nanoparticle can accurately release the drug or active substance loaded in it to the inner wall of the bladder only by the method of intravesical therapy, and can adhere to the inner wall of the bladder to prolong the time that the pharmaceutical composition exists in the bladder, thereby increasing the efficiency of administering hydrophobic drugs or active substances in the bladder.

Meanwhile, the pharmaceutical composition for intravesical therapy of the present disclosure may also comprise an effective amount of the nanoparticle of the present disclosure and a pharmaceutically acceptable carrier.

The following would take botulinum toxin as an exemplary hydrophobic compound to describe the preparation method and stability test of the nanoparticle containing botulinum toxin in detail. And the nanoparticle is tested in the experimental animals with overactive bladder to release the botulinum toxin contained in it into the inner wall of the bladder by intravesical therapy, to confirm that the nanoparticle by the preparation method of the present disclosure has a special composition and structure. The nanoparticle can indeed be used to contain hydrophobic substances, so as to accurately release the loaded drug or active substance into the inner wall of the bladder.

Example 1

Preparation of Nanoparticle Containing Hydrophobic Substance

In an embodiment of the present disclosure, the nanoparticle of the present disclosure contains hydrophobic botulinum toxin to prepare the nanoparticle of the present disclosure. First of all, before starting the preparation, it is necessary to maintain the water circulation machine below 10° C., and 4% alginate aqueous solution, 4% calcium chloride aqueous solution, and 20% gelatin aqueous solution are formulated. 100 U of botulinum toxin powder was suspended and dispersed in 100 μL of normal saline. The 4% alginate aqueous solution was mixed with 40 mg/50 mL of hyaluronic acid in a volume ratio of 0.8-1.2:0.8-1.2, preferably 1:1, and the final concentration of alginate is 2-2.4%, preferably 2%, not less than 2%, as the working solution of alginate and hyaluronic acid. After preheating the 20% gelatin aqueous solution to 40-50° C., it was mixed with the aforementioned suspended solution of botulinum toxin in a volume ratio of 0.8-1.2:0.8-1.2, preferably 1:1. The mixed solution was then formulated so that the final concentration of gelatin is 8-12%, preferably 10%, as the working solution of gelatin and botulinum toxin.

Step 1: to emulsify the cooking oil in the oil phase with the working solution of gelatin and botulinum toxin in the water phase to form an emulsified layer. Here, due to the physical properties of oil-water separation, the volume of the oil phase is much larger than the volume of the water phase. After being shaken by an ultrasonic crusher, the water phase can be crushed into nano-scale water droplets and evenly distributed in the oil phase to form an emulsified solution. First, 10 mL of cooking oil was put into a glass sample bottle, and then the glass sample bottle containing cooking oil was put in an ultrasonic crusher. The water level of the water bath must be higher than the surface of the cooking oil, and the ultrasonic crusher was set to ultrasonically vibrate for 5 seconds and stop for 3 seconds, so as to prepare the nanoparticle containing botulinum toxin of the present disclosure. After turning on the ultrasonic crusher, 200 μL of the working solution comprising 10% gelatin and botulinum toxin was added in the oil phase, ultrasonic vibration was performed for 30 minutes, and ultrasonic vibration amplitude was set to 60%. The working solution comprising 10% gelatin and botulinum toxin needs to be dripped during the shaking of the ultrasonic crusher to avoid the gelatin from being shaken out smoothly.

Step 2: in order to deposit the outer layer on the outer side of the emulsified layer: after ultrasonic vibration for 30 minutes, 100 μL of the working solution comprising alginate and hyaluronic acid described above was added to the oil phase, ultrasonic vibration was performed in the same cycle for 30 minutes, and the ultrasonic amplitude of this step was set to 40%.

Step 3: in order to stabilize the shape of the formed nanoparticle: after ultrasonic vibration for 30 minutes, 100 μL of 4% calcium chloride aqueous solution was added to the oil phase, and ultrasonic vibration was performed in the same cycle for 10 minutes. The ultrasonic amplitude of this step was set to 30% to stabilize the alginate deposited on the outer side.

Step 4: in order to separate the oil phase from the water phase containing the nanoparticle of the present disclosure: after the ultrasonic vibration was completed, a new 15 mL centrifuge tube was prepared, the glass sample bottle was removed, the sample was slowly poured into the centrifuge tube and 5 mL of ddH$_2$O was added.

Delamination can be observed in this step, and because the samples to be obtained are all in the water phase, the centrifuge tube was slightly shaken, centrifuged at 1000 rpm for 10 minutes at room temperature, and then the oil phase was removed and only the water phase was retained.

Step 5, in order to completely separate the oil phase from the water phase: a new 15 mL centrifuge tube was prepared, the micropipette was replaced with a new tip, and the water phase was taken directly through the interface. The oil on the surface of the tip was wiped off with a paper towel, and some samples were excluded from the front end to ensure that all the products obtained are water-phase products. In this way, a product of at least 4 mL can be obtained, which is the nanoparticle of the present disclosure containing botulinum toxin.

Figure 1B:
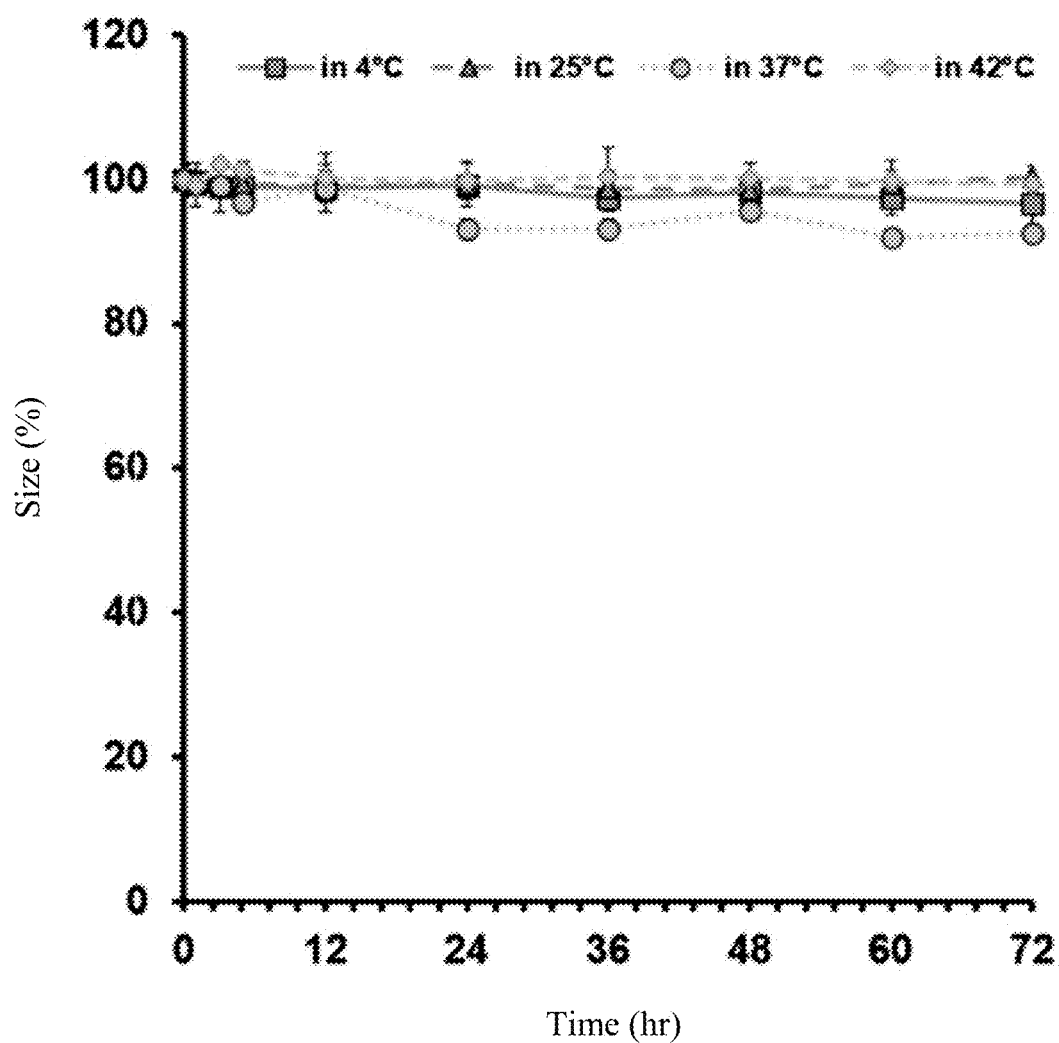
FIG. 1B shows that the nanoparticle in Example 1 has high stability at different temperatures.
Figure 1C:
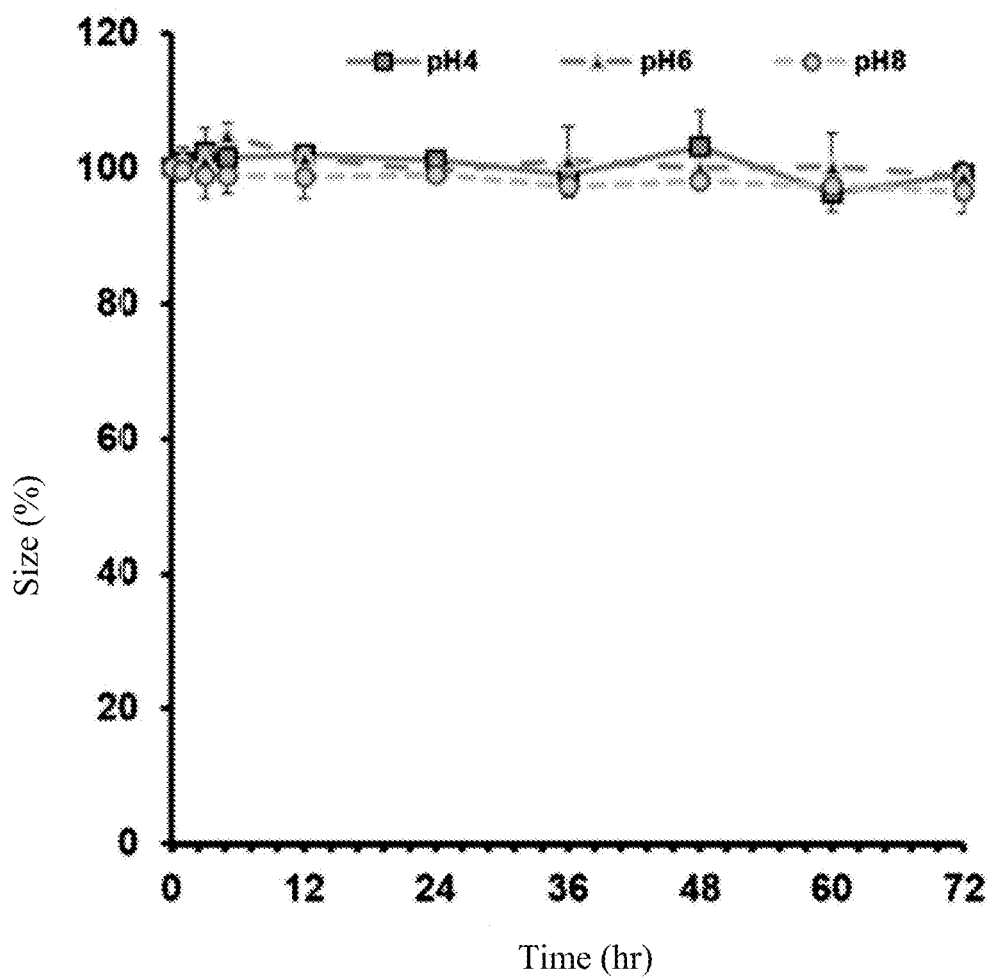
FIG. 1C shows that the nanoparticle in Example 1 has high stability at different pH values.

Finally, a transmission electron microscopy (TEM) or a Dynamic Light Scattering/Zeta Potential Analyzer was used to analyze the size of the obtained nanoparticle containing botulinum toxin of the present disclosure, and stability at different temperatures and pH values. The analysis results are shown in FIGS. 1A, 1B, and 1C, respectively. It can be seen in FIG. 1A that the nanoparticle containing botulinum toxin of the present disclosure obtained by the aforementioned preparation method has a hydration radius of about 20 nm, indicating that the above-mentioned preparation method can indeed obtain a nano-scale composition. FIGS. 1B and 1C are based on the aforementioned hydration radius of about 20 nm as a comparison basis, and the ratio of nanoparticle that still maintains a similar size is shown on the time axis under different temperature and pH value environments. It can be seen in FIG. 1B that the nanoparticle has a stable particle size at 4° C., 25° C., 37° C., and 42° C. In FIG. 1C, it can be seen that the nanoparticle also has a stable particle size at pH 4, pH 6, and pH 8. These results show that the nanoparticle containing botulinum toxin of the present disclosure has quite good stability in the bladder environment.

Example 2

Efficacy Testing of Nanoparticle of Present Disclosure

In an embodiment of the present disclosure, to further test whether the nanoparticle containing botulinum toxin of the present disclosure can indeed perform intravesical therapy, and can further release the botulinum toxin contained therein in the inner wall of the bladder to produce treatment efficacy. In addition, because botulinum toxin can improve the overactive bladder, in this example, an overactive bladder animal model was used to test the efficacy of the disclosed nanoparticle in intravesical therapy and release of active substances. Furthermore, in the treatment of overactive bladder, botulinum toxin targets Synaptosomal-Associated Protein-molecular 25 kDa (SNAP-25) and reduces release of neurotransmitters by cleaving SNAP-25 to achieve the effect of improving overactive bladder. Therefore, in the bladder tissue of the animal model, the difference in the expression of SNAP-25 would also be observed. Compared with the decrease in the expression of the control group, it means that the botulinum toxin is indeed released from the nanoparticle of the present disclosure to the target position.

In the examples of the present disclosure, the bladder of the experimental animals was flushed with hydrochloric acid (hydrogen chloride, HCl) to cause damage to the inner wall of the bladder and induce overactive bladder. In the examples of the present disclosure, the experimental animals used were female eight-week Wistar rats (200-250 g), which were purchased from Orient Bio Co. (Seongnam, South Korea). The experiment was divided into the following three groups: (1) the normal control group (saline group) in which the bladder of the experimental rats was continuously washed with normal saline for 1.5 hours, n=6; (2) the bladder of the experimental rats was continuously washed with 0.01 M hydrochloric acid for 1.5 hours to induce an overactive bladder (HCl group), n=6; and (3) the bladder of experimental rats was continuously flushed with 0.01 M hydrochloric acid for 1.5 hours to induce overactive bladder. The experimental group (HCl+nanoparticle group), which was treated with a single intravesical therapy of these rats with the nanoparticle of the present disclosure at a concentration of 20 U botulinum toxin/1 mL every other day, n=3; intravesical therapy was performed via urethral cannula at a flow rate of 1.2 mL/hour.

Seven days after the experimental rats were treated with the aforementioned three groups, the overactive bladder of the experimental rats was detected by urodynamic examination. The expression of SNAP-25 in bladder tissue was observed by Western blotting. This urodynamic test is to measure the intravesical pressure by inserting a PE tube into the top of the bladder for two hours, and analyze the changes of intravesical pressure during urination interval and urination to determine the overactive bladder. The detection items include: amplitude of bladder contraction, duration of voiding contraction, maximal amplitude of bladder contraction, baseline intravesical pressure, and intra contraction interval of bladder. Among these detection items, the interval between bladder contractions is the main indicator for determining overactive bladder. Subsequently, under the condition of anesthesia of these rats, the bladder tissue was excised, and after being slightly soaked in normal saline and blotted dry with paper towel, anti-SNAP-25 antibody (purchased from BioLegend) was used in Western blotting, followed by observation of the expression level of SNAP-25 in these bladder tissues.

Figure 2A:
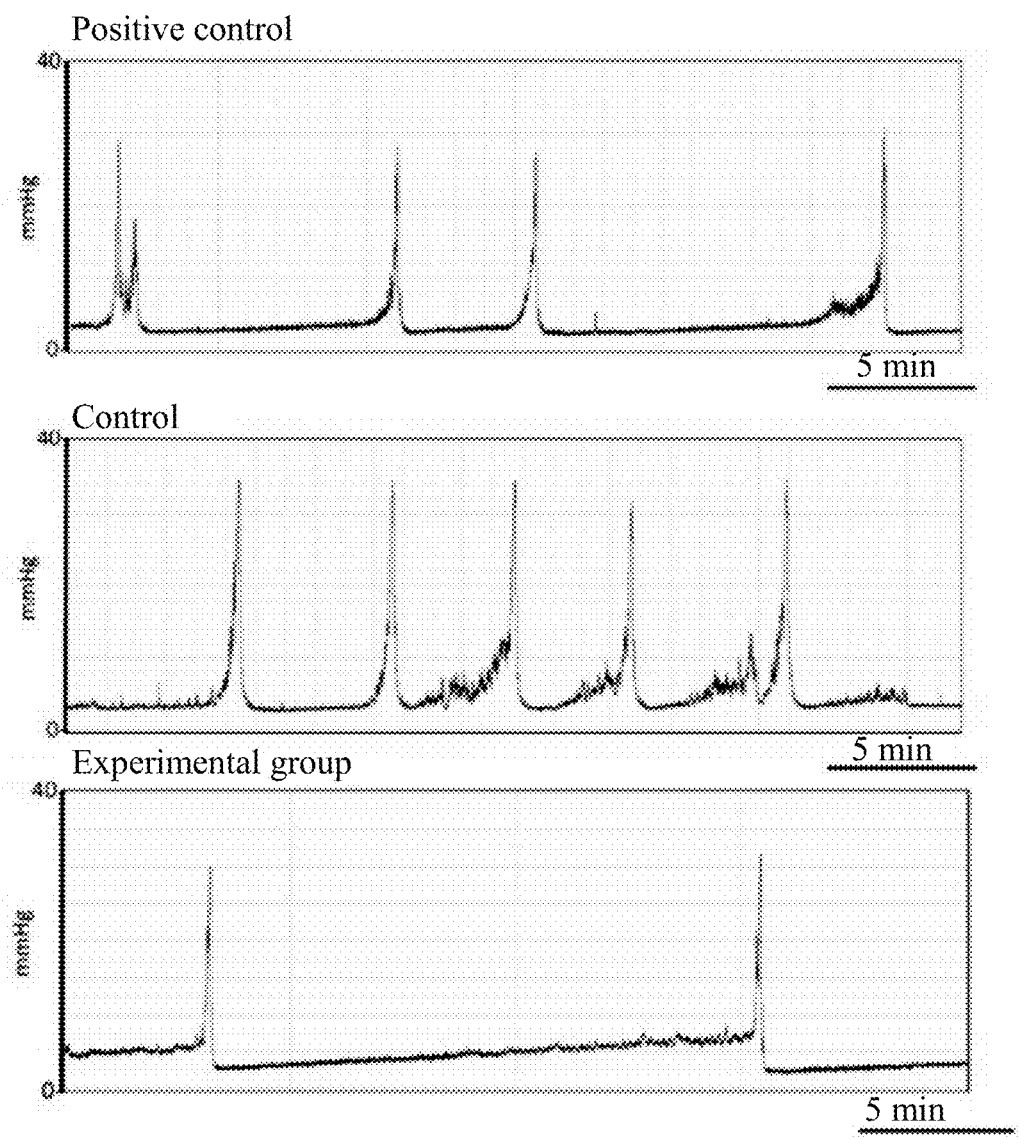
FIG. 2A shows the contraction interval of the bladder after intravesical therapy of the nanoparticle containing botulinum toxin in Example 2 in an experimental animal model.
Figure 2B:
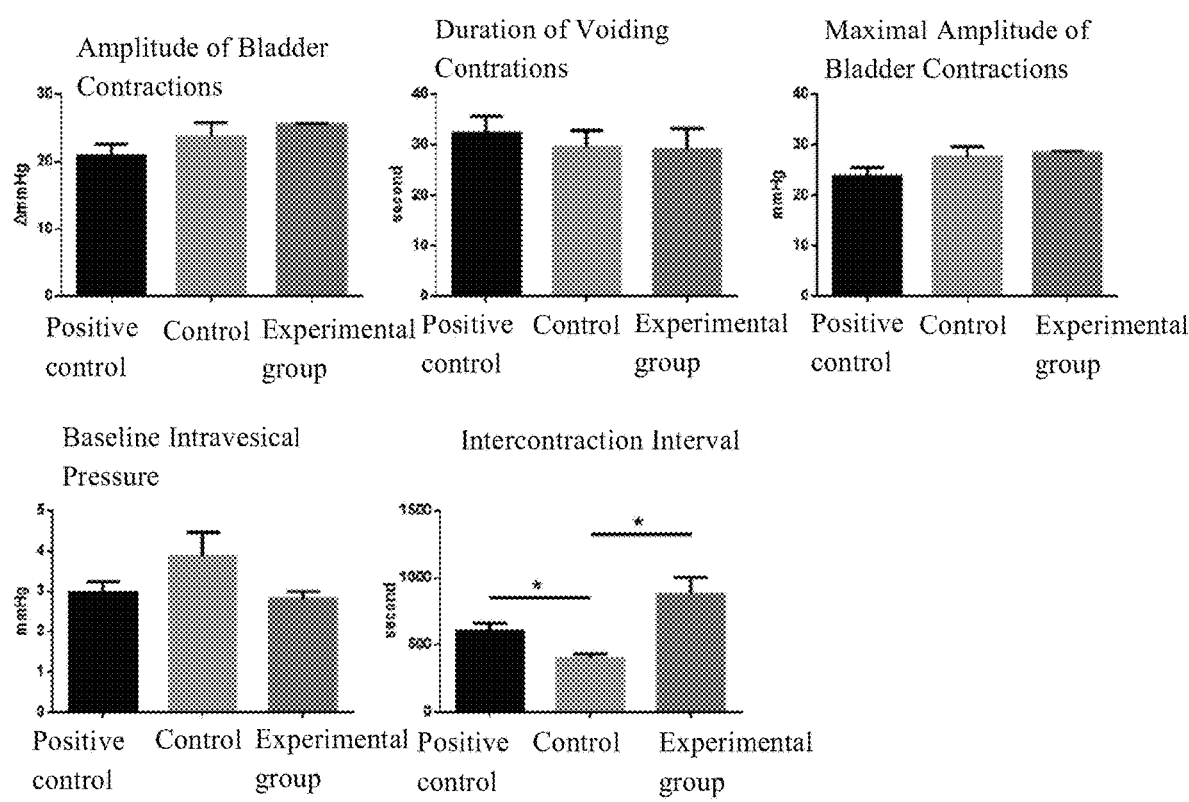
FIG. 2B shows the results of urodynamic examination of the nanoparticle containing botulinum toxin in Example 2 after intravesical therapy in an experimental animal model.

The urodynamic test results of these experimental rats are shown in FIGS. 2A and 2B. In FIG. 2A, it can be seen that after the bladder of the experimental rat is flushed with hydrochloric acid, the contraction interval of the bladder would be shortened, indicating that flushing the bladder with hydrochloric acid can indeed establish an experimental animal model with overactive bladder. After intravesical therapy with the nanoparticle of the present disclosure containing botulinum toxin, the contraction interval of the bladder can be significantly prolonged. These results show that the nanoparticle of the present disclosure is indeed used for intravesical therapy, and the botulinum toxin contained in the nanoparticle of the present disclosure can be released to the bladder wall with intravesical therapy, so as to produce the effect of treating overactive bladder. Both interstitial cystitis and chemical cystitis can lead to overactive bladder, so in this embodiment, the nanoparticle of the present disclosure can also be used to treat interstitial cystitis and chemical cystitis, so as to improve the overactive bladder.

Furthermore, it can also be seen in FIG. 2B that the amplitude and maximum amplitude of bladder contractions of experimental rats are not affected after treatment with the nanoparticle containing botulinum toxin of the present disclosure. It is shown that the nanoparticle of the present disclosure is targeted on the inner wall of the bladder without releasing the botulinum toxin contained therein to the detrusor muscle, thereby causing the side effect of dysuria caused by botulinum toxin. From this result, it can be known that the nanocarrier of the present disclosure can target the inner wall of the bladder for the administration of active ingredients.

Figure 3:
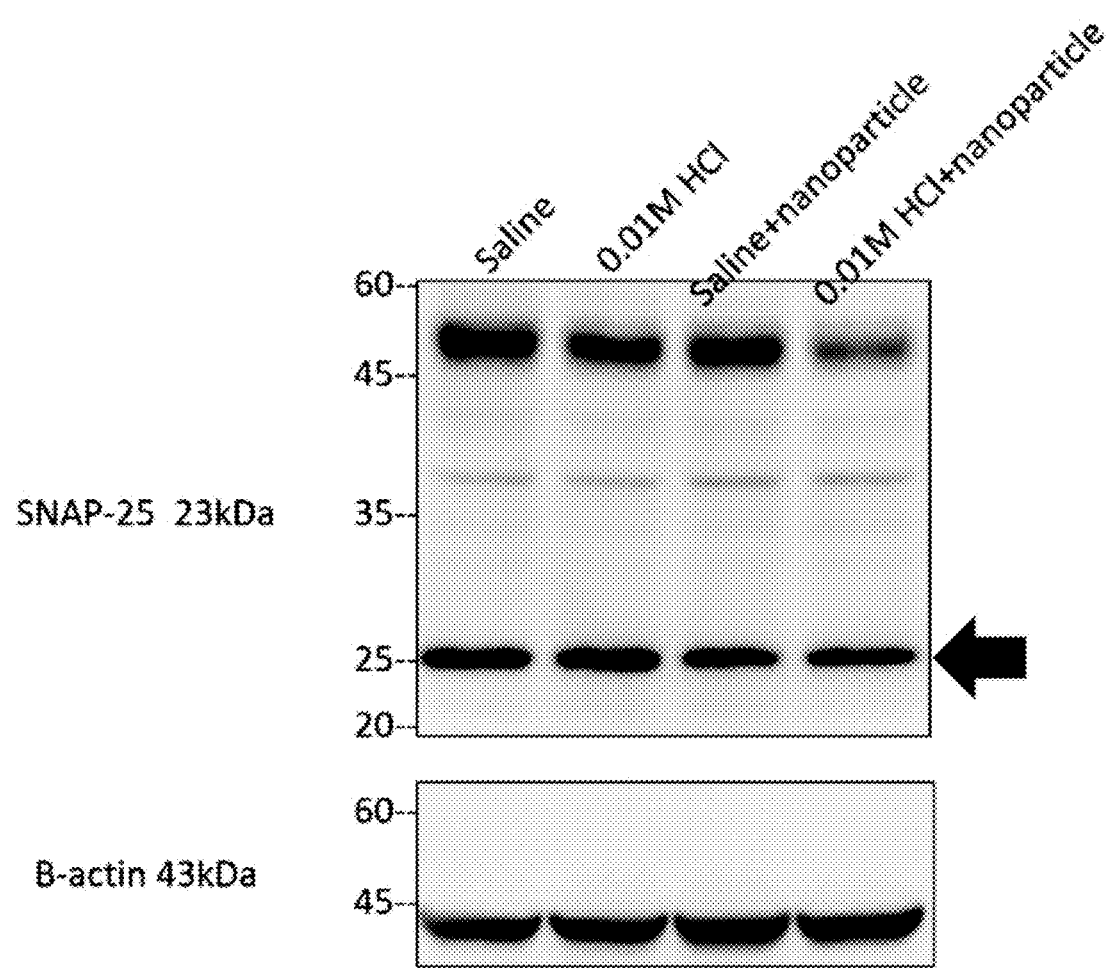
FIG. 3 shows the expression of synaptosomal-associated protein-molecular 25 kDa (SNAP-25) in bladder tissue after intravesical therapy of the nanoparticle containing botulinum toxin in Example 2 in an experimental animal model.

The test results of the expression level of SNAP-25 (23 kDa) in the bladder tissue of these experimental rats are shown in FIG. 3. In addition to the aforementioned three sets of experiments, another set of experiments was carried out. After rinsing the bladders of experimental rats continuously with normal saline for 1.5 hours, these rats in the experimental group (saline+nanoparticle group) were treated with a single intravesical therapy with the nanoparticle of the present disclosure at a concentration of 20 U botulinum toxin/1 mL. The operation of intravesical therapy and the operation of Western blotting are as described above. It can be seen from FIG. 3 that the content of SNAP-25 in the bladder tissue of experimental rats can indeed be reduced after intravesical therapy with the nanoparticle containing botulinum toxin of the present disclosure. It is shown that the nanoparticle of the present disclosure can release the botulinum toxin contained in the nanoparticle of the present disclosure to the bladder wall by simple intravesical therapy, so as to cleave SNAP-25 to produce the effect of treating overactive bladder. Furthermore, in FIG. 3, it can be seen that the expression level of SNAP-25 decreased even in the experimental group in which the bladder lining was not damaged by hydrochloric acid. It is shown that the nanoparticle of the present disclosure is not limited to administering active ingredients to damaged bladder epidermis, but can be used for bladder epidermis.

In summary, the present disclosure can prepare the nanoparticle of the present disclosure only by means of ultrasonic vibration. Emulsifying the hydrophobic substance is emulsified with a gelatin, a chitosan, or a combination thereof to form an emulsified layer, and depositing an outer layer containing an alginate and hyaluronic acid on the outer side of the emulsified layer to produce the nanoparticle of the present disclosure. The nanoparticle has a stable structure at different temperatures and pH values, indicating that it can maintain high stability in the physiological environment of the bladder.

Furthermore, in the test of the experimental animal model, it can be known that the nanoparticle in the present disclosure can indeed be used to load the hydrophobic drugs or active substances for treating the bladder. And the formed nanoparticle can accurately release the drug or active substance loaded in it to the inner wall of the bladder only by the method of intravesical therapy, not only for damaged bladder epidermis, but also for users with intact bladder epidermis.

Although the present invention has been described with reference to the preferred embodiments, it will be apparent to those skilled in the art that a variety of modifications and changes in form and detail may be made without departing from the scope of the present invention defined by the appended claims.

What is claimed is:

1. A nanoparticle containing a hydrophobic substance, comprising:
   an emulsified layer containing an emulsified hydrophobic substance; and
   an outer layer containing an alginate and a hyaluronic acid;
   wherein the outer layer is deposited on an outer side of the emulsified layer.

2. The nanoparticle according to claim 1, wherein the emulsified hydrophobic substance is emulsified with a gelatin, a chitosan, or a combination thereof.

3. The nanoparticle according to claim 1, wherein the hydrophobic substance is a botulinum toxin.

4. The nanoparticle according to claim 1, wherein the alginate and the hyaluronic acid are formed in a ratio of 0.8-1.2:0.8-1.2.

5. The nano particle according to claim 1, wherein the nan op article has a diameter of 16-24 nm.

6. A method for preparing the nanoparticle according to claim 1, comprising:
   (1) emulsifying a hydrophobic substance to form an emulsified layer; and
   (2) depositing an alginate and a hyaluronic acid on the outer side of the emulsified layer.

7. The method according to claim 6, wherein emulsifying the hydrophobic substance is emulsified with a gelatin, a chitosan, or a combination thereof.

8. The method according to claim 6, wherein depositing the outer layer is carried out with an ultrasound.

9. The method according to claim 6, wherein the alginate and the hyaluronic acid are formed in a ratio of 0.8-1.2:0.8-1.2.

10. The method according to claim 6, wherein the hydrophobic substance is a botulinum toxin.

11. A method for treating bladder-related disease, comprising administering to a subject in need thereof a pharmaceutical composition comprising an effective amount of the nanoparticle according to claim 1.

12. The method according to claim 11, wherein the bladder-related disease is interstitial cystitis, chemical cystitis, or overactive bladder.

13. The method according to claim 11, wherein the hydrophobic substance is a botulinum toxin.

14. The method according to claim 13, wherein the bladder-related disease is interstitial cystitis, chemical cystitis, or overactive bladder.

* * * * *